(12) United States Patent
Müller et al.

(10) Patent No.: US 9,000,610 B2
(45) Date of Patent: Apr. 7, 2015

(54) FIELD DEVICE FOR A PROCESS AUTOMATION SYSTEM HAVING AN INTRINSICALLY SAFE POWER SUPPLY DEVICE

(75) Inventors: Harald U. Müller, Fulda (DE); Yannick Maret, Dättwil (CH)

(73) Assignee: ABB Technology AG, Zurich (CH)

( * ) Notice: Subject to any disclaimer, the term of this patent is extended or adjusted under 35 U.S.C. 154(b) by 809 days.

(21) Appl. No.: 13/195,424

(22) Filed: Aug. 1, 2011

(65) Prior Publication Data
US 2012/0091809 A1 Apr. 19, 2012

(30) Foreign Application Priority Data
Jul. 30, 2010 (DE) .................... 10 2010 032 831

(51) Int. Cl.
 *H02J 1/10* (2006.01)
 *G05B 19/042* (2006.01)
 *H02H 9/00* (2006.01)
 *H04L 12/40* (2006.01)

(52) U.S. Cl.
 CPC .... *G05B 19/042* (2013.01); *G05B 2219/25364* (2013.01); *G05B 2219/25428* (2013.01); *H02H 9/008* (2013.01); *H04L 2012/40215* (2013.01); *H04L 2012/4026* (2013.01); *Y02B 70/3241* (2013.01); *Y04S 20/227* (2013.01)

(58) Field of Classification Search
 USPC .......................................... 307/62
 See application file for complete search history.

(56) References Cited

U.S. PATENT DOCUMENTS

| 6,321,585 | B2 * | 11/2001 | Sgourakes | ...................... 73/1.68 |
| 2004/0012264 | A1 * | 1/2004 | Burger et al. | .................... 307/64 |
| 2007/0227572 | A1 | 10/2007 | Piasecki et al. | |
| 2008/0079393 | A1 * | 4/2008 | Spartano et al. | ............. 320/110 |
| 2009/0092398 | A1 * | 4/2009 | Graber et al. | ................. 398/116 |
| 2010/0038964 | A1 | 2/2010 | Budmiger et al. | |
| 2010/0200039 | A1 | 8/2010 | Piasecki et al. | |

FOREIGN PATENT DOCUMENTS

| DE | 201 07 116 U1 | 8/2001 |
| DE | 200 23 865 U1 | 2/2007 |
| DE | 10 2005 043 771 A1 | 3/2007 |
| DE | 10 2006 014 444 A1 | 10/2007 |

(Continued)

OTHER PUBLICATIONS

Machine translation of WO 2004/082054; Applicant: ABB Research LTD; Inventor: Scheible Guntram; Sep. 2004.*

(Continued)

*Primary Examiner* — Jared Fureman
*Assistant Examiner* — Duc M Pham
(74) *Attorney, Agent, or Firm* — Buchanan Ingersoll & Rooney PC

(57) ABSTRACT

The disclosure relates to a field device of a process automation system, having at least one first intrinsically safe power supply unit, which provides locally stored electrical energy in an integrated storage element for supplying power to an electronics unit for process control. To supply power to intrinsically safe field devices from locally stored electrical energy in line with demand, it is proposed that in addition, at least one additional intrinsically safe power supply unit is integrated therein, which is fed by a power generation unit providing locally renewable electrical energy.

17 Claims, 3 Drawing Sheets

(56) References Cited

FOREIGN PATENT DOCUMENTS

| | | |
|---|---|---|
| DE | 10 2007 021 099 A1 | 11/2008 |
| DE | 10 2008 029 956 A1 | 12/2009 |
| DE | 10 2008 033 048 A1 | 2/2010 |
| DE | 10 2008 043 199 A1 | 4/2010 |
| WO | WO 01/73382 A1 | 10/2001 |
| WO | WO 2004/082054 A1 | 9/2004 |

OTHER PUBLICATIONS

German Examination Report dated Feb. 2, 2011.
Search Report dated Nov. 10, 2011, issued in the corresponding European Patent Application No. 11005930.0.

* cited by examiner

FIELD DEVICE FOR A PROCESS AUTOMATION SYSTEM HAVING AN INTRINSICALLY SAFE POWER SUPPLY DEVICE

RELATED APPLICATION

This application claims priority under 35 U.S.C. §119 to German Patent Application No. 10 2010 032 831.6 filed in Germany on Jul. 30, 2010, the entire content of which is hereby incorporated by reference in its entirety.

FIELD

The present disclosure relates to a field device for a process automation system. More particularly, the present disclosure relates to a field device having at least one first intrinsically safe power supply unit which provides locally stored electrical energy in an integrated storage element for supplying power to an electronics unit for the purpose of process control.

The area of application of the present disclosure extends in principle to all field devices as technical devices in the field of automation engineering, which stand in a direct relation to a production process. Such field devices can be both actuators, such as actuating members or valves, and sensors, such as measurement transducers, in manufacturing automation and process automation, for example. The field devices are connected to a higher-level control system, for example, via a field bus. By means of this arrangement, the data are analyzed and are then used for regulation, control and further processing. Communications standards for the field bus can be based on CAN, HART, PROFIBUS, or they can also be based on ETHERNET, Profinet, or IP. Field devices, such as 4-20 mA devices, but also those with a field bus, which are supplied with power from the bus line connected to them, have only limited electrical power available to them. They face increasing requirements with regard to their electrical energy demand. This is because new functional modules designed to be integrated into field devices, such as, for example, mobile data communications modules, require additional electrical power.

BACKGROUND INFORMATION

DE 10 2008 033 048 A1 discloses a field device for a process automation system which is equipped with a device for locally acquiring electrical power. In addition to or as an alternative to supplying electrical power in a two conductor bus, electrical energy is generated locally in the field device by converting an operating pressure applied there by means of a piezo-element arrangement. The piezo-element arrangement is designed as a spring mounted piezo-electric patch transducer that is capable of vibrating. This solution for locally generating electrical energy directly in the field device assumes, however, that the operating pressure is constantly available as an energy source. This also restricts the area of application of this technical solution to pressure-operated field devices.

DE 200 238 65 U1 discloses an additional technical solution to the local supply of field devices with electrical power, in which an additional power supply unit is provided which can be electrically connected to the field device via a service socket. The power supply unit includes at least one battery. As an alternative to or in conjunction with the at least one batter, it is further proposed to use, for example, solar cells, a Peltier element, a vibrational energy transducer or a rotational energy transducer.

However, using a conventional battery requires replacement of the battery once it become exhausted. If the battery is in the form of an accumulator, the battery needs to be recharged. A battery status indication or the like is then also necessary. By contrast, while solar cells and the other means for supplying power use locally renewable energy using photovoltaic or electrothermal or electromechanical conversion, the utilization of these forms of energy is dependent on the presence of light, heat or vibrations. Since field devices often need to be operated in explosion-hazardous environments, care must also be taken that these field devices themselves, as well as their power supply units, are designed to be intrinsically safe according to the relevant safety regulations.

SUMMARY

An exemplary embodiment of the present disclosure provides a field device of a process automation system. The exemplary field device includes an electronics unit configured for process control of the field device. The exemplary field device also includes at least one first intrinsically safe power supply unit including an integrated storage element configured for storing locally stored electrical energy. The at least one first intrinsically safe power supply unit is configured for supplying power via the integrated storage element to the electronics unit. The exemplary field device also includes at least one second intrinsically safe power supply unit integrated in the field device and including a power generation unit configured for feeding the at least one second intrinsically safe power supply unit with locally renewable energy for the at least one second intrinsically safe power supply unit to supply the locally renewable electrical energy to the electronics unit.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
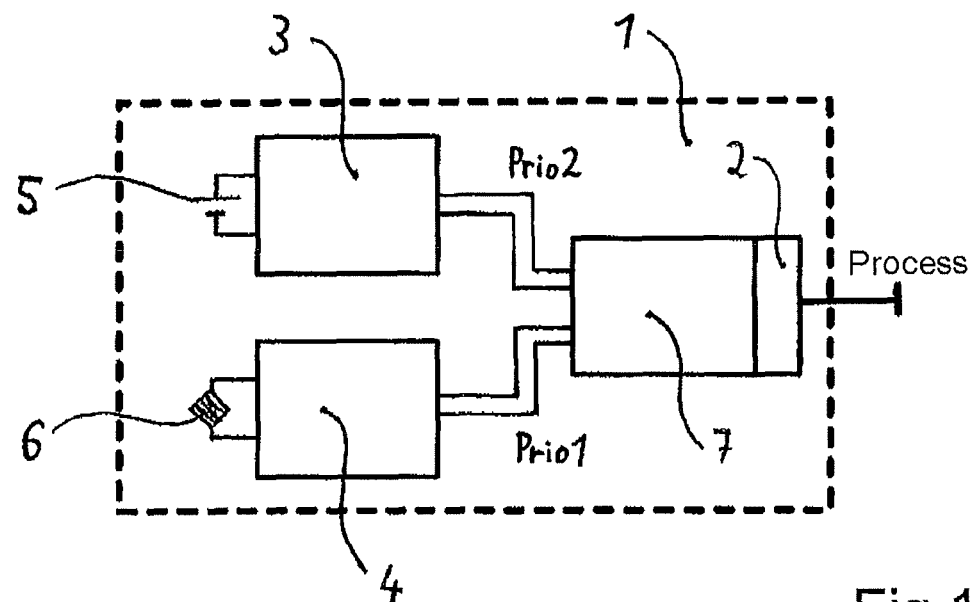
FIG. 1 illustrates a block circuit diagram of a field device having two intrinsically safe power supply units of different types according to an exemplary embodiment of the present disclosure.

Exemplary embodiments of the present disclosure provide intrinsically safe field devices for a process automation system in which a supply of power in line with demand is ensured from locally stored electrical energy.

Exemplary embodiments of the present disclosure provide a field device which includes at least one first intrinsically safe power supply unit and at least one second intrinsically safe power supply unit. The at least one first intrinsically safe power supply unit includes a storage element for supplying locally stored power to an integrated electronics unit for process control or the like, and the at least one second intrinsically safe power supply unit is supplied by a power supply unit providing locally renewable electrical energy.

Accordingly, exemplary embodiments of the present disclosure provide that a storage element for supplying power with high electrical capacity, albeit one which is exhausted over its lifetime, can be supplemented with an additional power generation unit which is capable of locally converting, for example, light, heat or vibrational energy into electrical energy, in order to thereby primarily carry out the function of supplying power to the field device.

In accordance with an exemplary embodiment, the field device of the present disclosure can be operated in such a manner that the supply of power from locally renewable energy takes priority over the supply of power from the exhaustible storage element. For this purpose, the field device can include electrical switching means which, during normal operation, switch the second intrinsically safe power supply unit over to the electronics unit in priority over the first intrinsically safe power supply unit. These electrical switching means ensure that the additional intrinsically safe power supply unit, which is supplied from locally available renewable energy, assumes the power supply function for as long as the renewable energy, for example, sunlight, is available. Switchover to the first intrinsically safe power supply unit with the storage element takes place when the renewable energy is temporarily no longer available, for example, during the night. Accordingly, this feature can also be extended to heat energy or mechanical vibrational energy or the like, as renewable energy sources.

In order to be able to replace or recharge an exhausted storage element when required, this is accommodated in a demountable but intrinsically safe manner in the field device. The intrinsic safety is a technical property of a device or system, which by virtue of special construction principles ensures that no unsafe condition occurs even in the event of a fault. This can be achieved, for example, by predetermined breaking points, special power sources or other electronic measures, so that the dangerous situation cannot arise. The error case describes situations for which a risk exists. For example, the possibility of spark formation when an electrical circuit is closed only carries a risk inside explosion-hazardous areas. In explosion-hazardous areas, electrical devices in the flame-proof intrinsic safety class are used for tasks in measurement and control engineering. In these devices, by limiting the current and voltage, no ignition-capable energy can occur. This means that a possible spark formation cannot trigger an explosion of explosive fuel-air mixtures or the like.

In accordance with exemplary embodiments of the present disclosure, the storage element only needs to be replaced after very long operating cycles—if at all. By means of the electrical switching means, for example, while the first intrinsically safe power supply unit with the storage element is being replaced, the supply of power to the electronics unit is temporarily taken over by the second intrinsically safe power supply unit with the power generation unit using locally renewable electrical energy. Where necessary, an electrical energy buffer with low capacity can be additionally integrated herein, in order to guarantee the supply of power during the short bridging period, even at times when the renewable energy source may not be available, for example in the case of a solar element during the night.

The power generation unit of the second intrinsically safe power supply unit can be in the form of a photovoltaic transducer, that is, a solar element, and/or of an electro-thermal transducer, for example a Peltier-element. It is, of course, also possible to use other types of renewable energy via appropriate transducers, if these are capable, depending on the application of the field device, of supplying sufficient electrical energy.

To further increase the intrinsic safety, the electronics unit of the field device downstream of both types of intrinsically safe power supply units, which essentially assumes the local control functions, has an additional intrinsically safe electronic circuit including at least one of reverse current protection, a current limiter and a voltage limiter.

In accordance with an exemplary embodiment, this intrinsically safe electronic circuit of the electronics unit includes at least two inputs, in each case two-pole, for each intrinsically safe power supply unit, in which a reverse current protection element for preventing a reverse flow of current into the non-explosion-proofed environment is connected downstream, and which are then electrically joined together and passed to a common current limiting element and voltage limiting element, before the operating voltage is provided via a two-pole output of the remaining electronics unit. This intrinsically safe circuit upstream of the electronics unit therefore creates a high degree of intrinsic safety using few electronic components.

To guarantee the intrinsic safety of the first intrinsically safe power supply unit having the storage element, the power supply unit can be equipped with its own intrinsically safe electronic circuit, which also has the same range of functionality cited above for the electronics unit.

According to an exemplary embodiment, this range of functionality is obtained by the circuit of the first intrinsically safe power supply unit including a current limiting element connected in series with the storage element, and a reverse current protection element leading to the output. A two-pole output is provided for electrically connecting to the corresponding input of the electronics unit of the field device.

The additional intrinsically safe power supply unit providing the locally renewable electrical energy should also be equipped with this range of functionality to guarantee intrinsic safety. For instance, an electronic circuit for controlling the output voltage can be used, in order to adapt this according to the level of power that can be generated by the power generation unit.

According to a exemplary embodiment, the electronic circuit includes a current limiting element connected in series with the power generation unit and a reverse current protection element towards the output as well as a special control unit for matching the energy generated by the power generation unit to the loading power of the following circuit.

In accordance with an exemplary embodiment of the present disclosure, the combination of the two types of intrinsically safe power supply units guarantees the intrinsic safety according to the standard that must be observed. Additionally, an intrinsically safe power supply unit can also be replaced without causing the field device to fail, wherein the intrinsic safety remains guaranteed throughout the replacement. Such standards for guaranteeing intrinsic safety in explosive environments are, for example, FM, CSA, ATEX, IECEX. In accordance with exemplary embodiments of the present disclosure, not only is every power supply unit itself and also the electronics unit of the field device intrinsically safe per se, but also the combination of these modules and therefore the field device as a whole. The intrinsically safe power supply units are in this case each safely demountable within the explosive environment. Since multiple intrinsically safe power supply units of different types perform the power supply function, the full functionality of the field device can be maintained during the replacement of one of the intrinsically safe power supply units in case of repair. During normal operation, however, the intrinsically safe power supply unit, which obtains the electrical energy from locally available renewable energy, is used with priority.

Within the overall scope of the field device, an exemplary effect of the totality of the intrinsically safe units with respect to the reverse current protection elements is that the sum of all currents or voltages of all intrinsically safe units remain below the limit specified by the standard. This also applies with respect to the creep current distances which are specified by the standard.

FIG. 1 is a block circuit diagram of a field device having two intrinsically safe power supply units of different types according to an exemplary embodiment of the present disclosure. FIG. 1 illustrates a field device 1 of a process automation system. The field device 1 includes an electronics unit 2 for process control, which obtains the necessary electrical operating power from both a first intrinsically safe power supply unit 3 and a second intrinsically safe power supply unit 4. In accordance with an exemplary embodiment, the first intrinsically safe power supply unit 3 provides the electrical operating energy using an integrated storage element 5, e.g. an electrical accumulator. On the other hand, the second intrinsically safe power supply unit 4 has a power generation unit 6. In accordance with an exemplary embodiment, the power generation unit 6 may be, for example, a photovoltaic transducer, which converts locally available light energy into electrical energy. In supplying the electrical energy, the second intrinsically safe power supply unit 4 has priority over the first intrinsically safe power supply unit 3 with the storage element 5.

Figure 2:
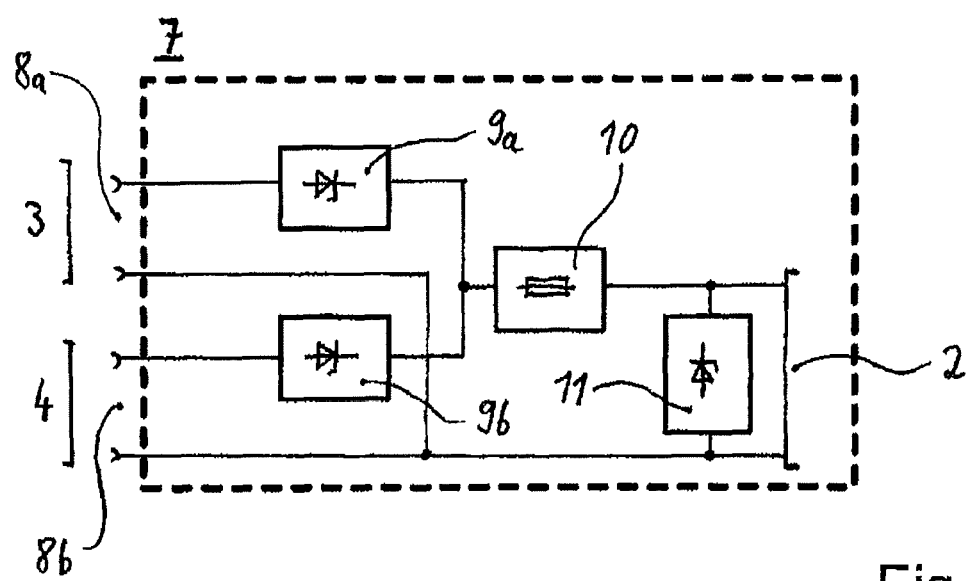
FIG. 2 illustrates an intrinsically safe electronic circuit for the electronics unit of the field device according to an exemplary embodiment of the present disclosure.

FIG. 2 illustrates an intrinsically safe electronic circuit for the electronics unit of the field device according to an exemplary embodiment of the present disclosure. As illustrated in FIG. 2, the electronics unit 2—which is only shown at the input side—includes an intrinsically safe electronic circuit 7 upstream, which has one two-pole input 8a and 8b for each intrinsically safe power supply unit 3 or 4, respectively. A reverse current protection element 9a or 9b is connected downstream of each of the inputs 8a and 8b, for preventing a reverse flow of current into the non-explosion-proofed environment. After joining together the two inputs 8a and 8b, a common current limiting element 10 is integrated into the current flow, which is followed by a voltage limiting element 11. Finally, downstream of the intrinsically safe circuit 7, the electrical operating voltage passes via a two-pole output to the rest of the electronics unit 2 of the field device 1.

Figure 3:
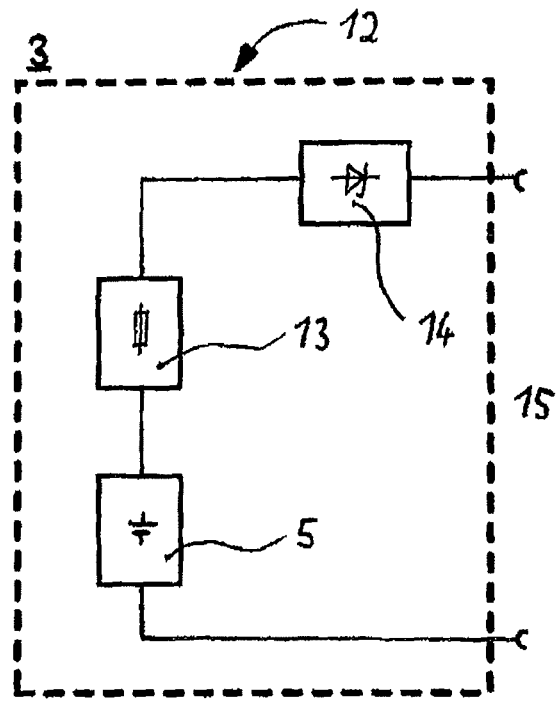
FIG. 3 illustrates an intrinsically safe electronic circuit of the first intrinsically safe power supply unit of the field device according to an exemplary embodiment of the present disclosure.

FIG. 3 illustrates an intrinsically safe electronic circuit of the first intrinsically safe power supply unit of the field device according to an exemplary embodiment of the present disclosure. As illustrated in FIG. 3, the first intrinsically safe power supply unit 3 includes the storage element 5 and a separate intrinsically safe electronic circuit 12. The separate intrinsically safe electronic circuit 12 of the first intrinsically safe power supply unit 3 includes a current limiting element 13 connected in series with the storage element 5 and a following reverse current protection element 14 leading to the two-pole output 15.

Figure 4:
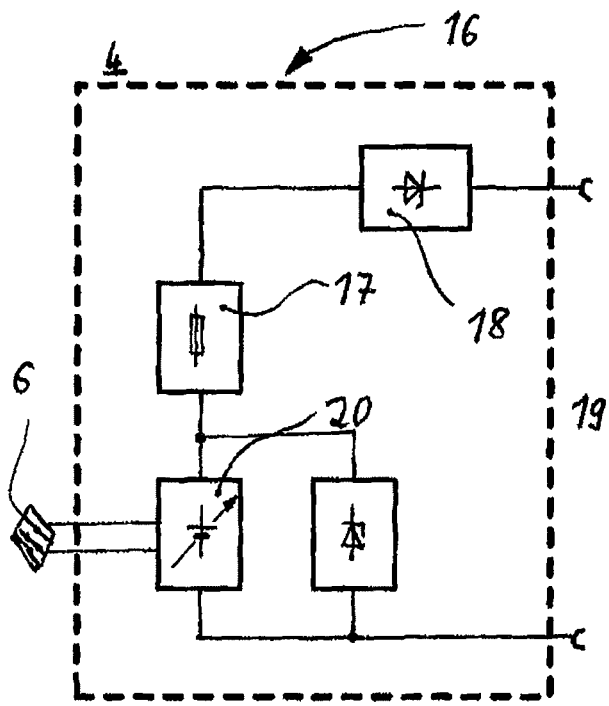
FIG. 4 illustrates an intrinsically safe electronic circuit of the second intrinsically safe power supply unit of the field device according to an exemplary embodiment of the present disclosure.

FIG. 4 illustrates an intrinsically safe electronic circuit of the second intrinsically safe power supply unit of the field device according to an exemplary embodiment of the present disclosure. As illustrated in FIG. 4, the second intrinsically safe power supply unit 4 providing the locally renewable electrical energy includes an electronic circuit 16 for regulating the output voltage. Its main element is a control unit 20 for matching the energy generated by the intrinsically safe power supply unit 4 to the loading power of the following circuit 7 of the electronics unit 2, which is connected via a two-pole output 19. The circuit 16 additionally includes a current limiting element 17 connected in series with the power generation unit 6, and a reverse current protection element 18 for creating the intrinsic safety.

Figure 5:
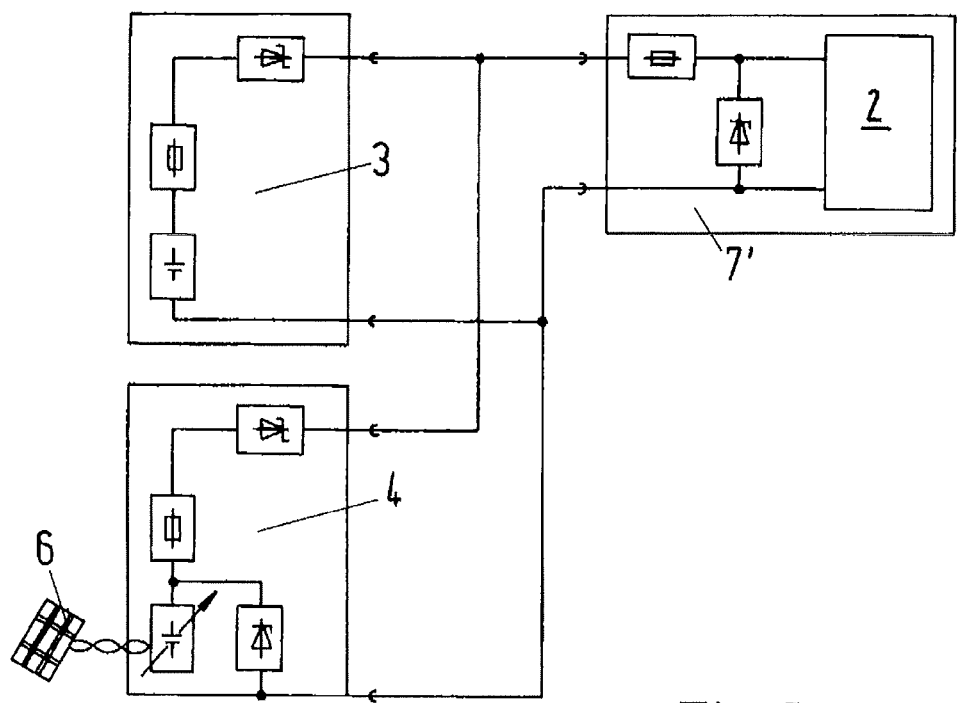
FIG. 5 illustrates an electronic circuit of a combination having two intrinsically safe power supply units and an intrinsically safe circuit of the electronics unit according to an exemplary embodiment of the present disclosure.

FIG. 5 shows a combination of the first intrinsically safe power supply unit 3 with the second intrinsically safe power supply unit 4, which are connected to a modified intrinsically safe electronic circuit 7', according to an exemplary embodiment of the present disclosure. In this exemplary embodiment, the output voltage of the second intrinsically safe power supply unit 4 is zero when the power generation unit 6 in the form of a photovoltaic transducer is not irradiated with light.

On the other hand, when the power generation unit 6 is irradiated with light, then the output voltage of the second intrinsically safe power generation unit 4 increases until current starts to flow to the intrinsically safe electronic circuit 7' of the electronics unit 2. As soon as sufficient power is obtained, the electricity supply from the first intrinsically safe power supply unit 3 is cut off. Since in this circuit the current cannot reach the other intrinsically safe power supply unit 3 or 4, respectively, due to the reverse current protection function, the power generated by the second intrinsically safe power supply unit 4 is fully available to the electronics unit 2. Accordingly, the power loading of the first intrinsically safe power supply unit 3 is sharply reduced.

Figure 6:
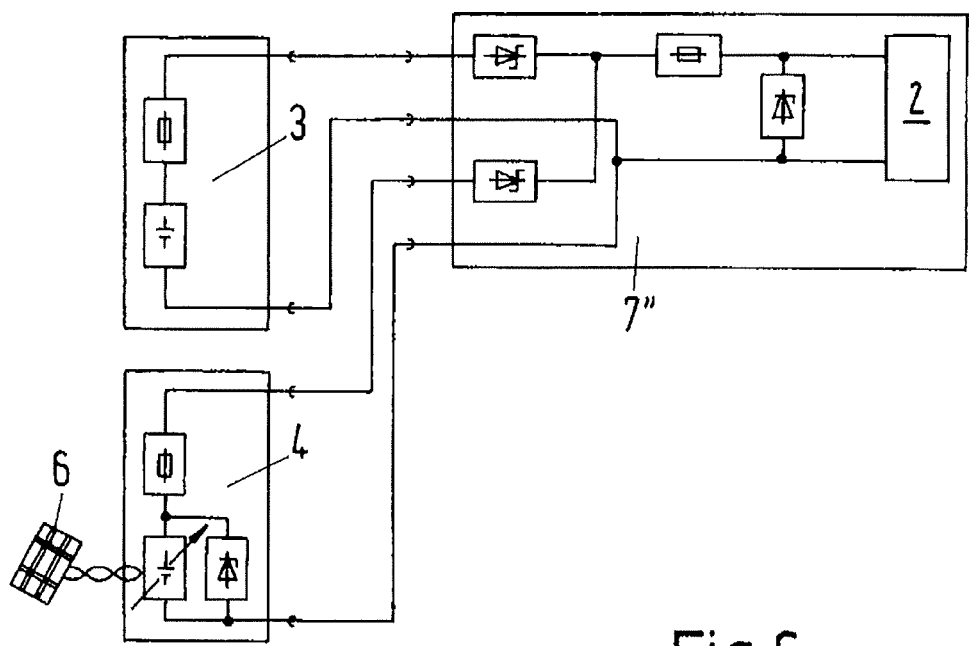
FIG. 6 illustrates an electronic circuit of a combination having two intrinsically safe power supply units and an intrinsically safe circuit of the electronics unit according to an exemplary embodiment of the present disclosure.

With reference to FIG. 6, the first intrinsically safe power supply unit 3 and the second intrinsically safe power supply unit 4 are connected to another intrinsically safe circuit 7" of the electronics unit 2, according to an exemplary embodiment of the present disclosure. This arrangement includes a reverse current protection function and also a current limiting and voltage limiting function, as also shown separately in FIG. 2.

The disclosure is not limited to the above described embodiments, but in fact also allows other modifications which are also covered by the scope of protection of the following claims. Thus, it is also possible, for example, to add additional IS-power supply units as required for supplying power to the electronics unit of a field device, or in parallel to also provide an alternative power supply via a wire-linked field bus.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE MARKS 1 field device
2 electronics unit
3 first intrinsically safe power supply unit
4 additional intrinsically safe power supply unit
5 storage element
6 power generation unit
7 intrinsically safe circuit
8 two-pole input
9 reverse current protection element
10 current limiting element
11 voltage limiting element
12 intrinsically safe circuit
13 current limiting element
14 reverse current protection element
15 two-pole output
16 electronic circuit
17 current limiting element
18 reverse current protection element
19 two-pole output
20 control unit

What is claimed is:

1. A field device of a process automation system, comprising:
    an electronics unit configured for process control of the field device;
    at least one first intrinsically safe power supply unit including an integrated storage element configured for storing locally stored electrical energy, the at least one first intrinsically safe power supply unit being configured for supplying power via the integrated storage element to the electronics unit;
    at least one second intrinsically safe power supply unit integrated in the field device and including a power generation unit configured for feeding the at least one second intrinsically safe power supply unit with locally renewable energy for the at least one second intrinsically safe power supply unit to supply the locally renewable electrical energy to the electronics unit; and
    electrical switching means for, during normal operation, switching the at least one second intrinsically safe power supply unit over to the electronics unit in priority over the at least one first intrinsically safe power supply unit.

2. The field device according to claim 1, wherein the power generation unit of the second intrinsically safe power supply unit includes at least one of an electro-thermal transducer and a photovoltaic transducer.

3. The field device according to claim 1, wherein the electronics unit of the field device includes an intrinsically safe electronic circuit, and
    wherein the intrinsically safe electronic circuit includes at least one of a reverse current protection, a current limiter, and a voltage limiter.

4. The field device according to claim 3, wherein:
    the intrinsically safe electronic circuit of the electronics unit includes at least two inputs which are each two-pole, and a reverse current protection element connected downstream of each intrinsically safe power supply unit, the reverse current protection element being configured for preventing a reverse flow of current into a non-explosion-proofed environment;
    each intrinsically safe power supply unit is electrically joined together downstream of the reverse current protection element and passed to a common current limiting element and voltage limiting element, to be made available to the electronics unit via a two-pole output.

5. The field device according to claim 1, wherein the first intrinsically safe power supply unit having the storage element is comprised in a separate intrinsically safe electronic circuit, which includes at least one of a reverse current protection, a current limiter and a voltage limiter, and which includes a two-pole output for connecting to a corresponding one of the inputs of the electronics unit.

6. The field device according to claim 5, wherein the intrinsically safe circuit comprises a current limiting element connected in series with the storage element and a reverse current protection element leading to the output.

7. The field device according to claim 1, wherein the second intrinsically safe power supply unit providing the locally renewable electrical energy includes an electronic circuit for controlling an output voltage so as to match the output voltage to a level of power for generation by the second intrinsically safe power generation unit.

8. The field device according to claim 7, wherein the electronic circuit with the power generation unit includes a series-connected current limiting element and a reverse current protection element leading to an output of the, and a control unit for matching the energy generated by the power generation unit to a loading power of the electronics unit.

9. The field device according to claim 1,
    wherein the normal operation comprises when the power generation unit is able to, based on environmental conditions, feed the at least one second intrinsically safe power supply unit with locally renewable energy.

10. The field device according to claim 1, wherein the storage element of the at least one first intrinsically safe power supply unit is replaceably accommodated in the field device, and
    wherein the second intrinsically safe power supply unit temporarily provides the supply of power to the electronics unit during a replacement of the storage element of the at least one first intrinsically safe power supply unit.

11. The field device according to claim 3, wherein the second intrinsically safe power supply unit providing the locally renewable electrical energy includes an electronic circuit for controlling an output voltage so as to match the output voltage to a level of power for generation by the second intrinsically safe power generation unit.

12. The field device according to claim 11, wherein the electronic circuit with the power generation unit includes a series-connected current limiting element and a reverse current protection element leading to an output of the, and a control unit for matching the energy generated by the power generation unit to the loading power of the intrinsically safe circuit of the electronics unit.

13. The field device according to claim 12, comprising:
    electrical switching means for, during normal operation, switching the second intrinsically safe power supply unit onto the electronics unit in priority over the first intrinsically safe power supply unit.

14. The field device according to claim 12, wherein the storage element of the at least one first intrinsically safe power supply unit is replaceably accommodated in the field device, and
    wherein the second intrinsically safe power supply unit temporarily provides the supply of power to the electronics unit during a replacement of the storage element of the at least one first intrinsically safe power supply unit.

15. The field device according to claim 4, wherein the storage element of the at least one first intrinsically safe power supply unit is replaceably accommodated in the field device, and
- wherein the second intrinsically safe power supply unit temporarily provides the supply of power to the electronics unit during a replacement of the storage element of the at least one first intrinsically safe power supply unit.

16. The field device according to claim 6, wherein the storage element of the at least one first intrinsically safe power supply unit is replaceably accommodated in the field device, and
- wherein the second intrinsically safe power supply unit temporarily provides the supply of power to the electronics unit during a replacement of the storage element of the at least one first intrinsically safe power supply unit.

17. The field device according to claim 8, wherein the storage element of the at least one first intrinsically safe power supply unit is replaceably accommodated in the field device, and
- wherein the second intrinsically safe power supply unit temporarily provides the supply of power to the electronics unit during a replacement of the storage element of the at least one first intrinsically safe power supply unit.

* * * * *